United States Patent [19]

Tameo

[11] 4,294,135
[45] Oct. 13, 1981

[54] TURBOMACHINE BALANCE CORRECTION SYSTEM

[75] Inventor: Robert P. Tameo, Peabody, Mass.

[73] Assignee: The United States of America as represented by the Secretary of the Navy, Washington, D.C.

[21] Appl. No.: 4,248

[22] Filed: Jan. 12, 1979

[51] Int. Cl.³ .............................................. F16F 15/22
[52] U.S. Cl. .................................................. 74/573 R
[58] Field of Search .............. 74/573 R, 572; 415/119

[56] References Cited

U.S. PATENT DOCUMENTS

| | | | |
|---|---|---|---|
| 1,620,871 | 3/1927 | Carrey | 74/573 |
| 1,876,526 | 9/1932 | Thearle et al. | 74/573 |
| 1,903,817 | 4/1933 | Johnson | 74/573 |
| 2,334,285 | 11/1943 | Philippi | 74/573 |
| 2,722,848 | 11/1955 | Stein | 74/573 |
| 3,273,419 | 9/1966 | Kollmann et al. | 74/573 |
| 4,003,265 | 1/1977 | Craig et al. | 74/573 R |

*Primary Examiner*—Kenneth Dorner
*Attorney, Agent, or Firm*—R. S. Sciascia; P. C. Lall; A. P. Durigon

[57] ABSTRACT

A balance system for rotating turbomachinery and other rotating devices is provided wherein balance correction is obtained by snap rings having both an intentional eccentricity of their center of mass and discrete peripheral features which are adapted to be received in corresponding recesses in the machinery.

12 Claims, 3 Drawing Figures

TURBOMACHINE BALANCE CORRECTION SYSTEM

The present invention concerns balancing means for rotating devices and, more particularly, a retaining ring balance correction means for rotating turbomachinery.

Rotatable assemblies are used in many technological fields and include components which are subjected to rotation at very high speeds. These components are supported mainly by drive shafts supported by bearings which are known to wear out rapidly when the mass of the assemblies is unbalanced because of manufacturing tolerances and lack of homogeneity of the material of the components among other reasons. Past attempts to eliminate mass unbalance have included the use of small bolts in the nature of tap screws which are turned into tapped holes in at least one of the rotating components; eccentric snap rings which are locked in place by tap screws turned into a split area in the major mass portion of the rings, and similar snap rings which are secured by compression and installed by means of handling tabs on one face of the rings, among other types of balancing rings. These balance correction methods are cumbersome for applications where components such as an interlocking midspan blade shroud render the installation of tap screws or other balance correction weights onto or under the blades extremely difficult if not impossible. The present invention avoids the deficiencies of prior balance correction methods in such installations.

Accordingly, it is an object of the present invention to provide a balance correction system that does not require access to blades for adjustment after installation.

Another object of this invention is to provide a balance correction system that affords easy locking in a particular radial configuration.

A further object of this invention is to provide a balancing arrangement for airplane turbine rotors which combines snap-in installation and conformity to available engine recesses.

A further object of this invention is to provide an axial retention of blades with axial dovetails as well as a balance correction system.

Other objects, advantages and novel features of the invention will become apparent from the following detailed description thereof when considered in conjunction with the following drawing in which like numerals represent like parts throughout and wherein.

The present invention, in general, concerns a balance system for an aircraft or other turbine engine rotor generally or in which a blade shroud or other impediment or appendage makes the installation of conventional balance correction means very cumbersome or virtually impossible. At least a pair of retaining rings with an intentional eccentricity of mass are snapped into place in one or more grooves in the rotor, with tabs formed on the periphery of each ring for engagement with dovetails or other slots or recesses in the rotor.

Figure 1:
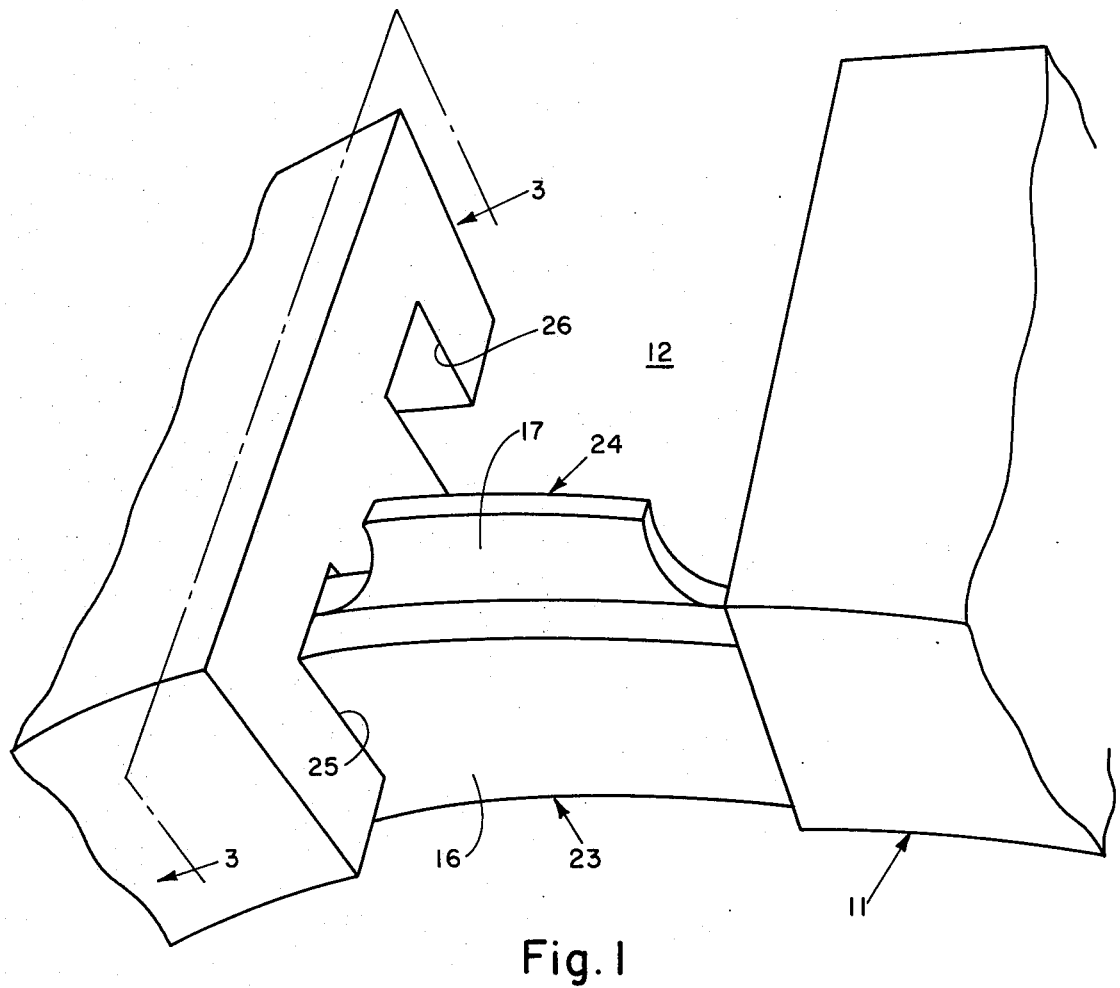
FIG. 1 is a perspective view of a portion of a rotor having dovetail slots and grooves with rings therein for receiving the balance means of the invention.
Figure 2:
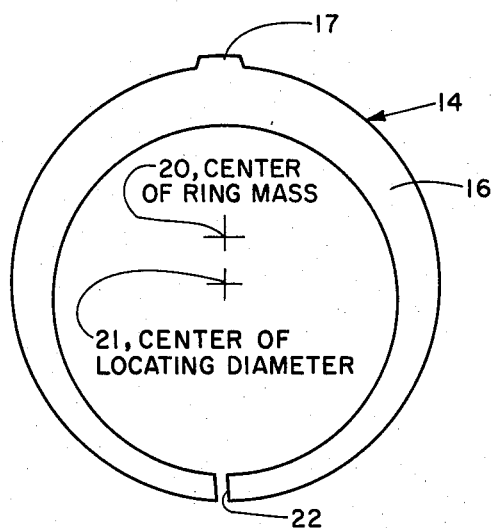
FIG. 2 is a front elevation of a preferred embodiment of the retaining ring balance correction means of the invention.

Referring to the drawing, FIG. 1 is a perspective view showing a rotor 11 having a plurality of dovetail slots 12 which afford space for the antirotation means of the invention. FIG. 2 illustrates a snap ring 14 formed according to a preferred embodiment wherein the ring is generally unbalanced in the widened area as seen at 16 and is additionally unbalanced such as by a tab 17 that is configured to be received in dovetail slots 12 in rotor 11 for antirotation purposes. The center of mass of a typical ring 14 is at 20, its center of rotation is at 21, and it is split at 22 to facilitate a pair of rings 23 and 24 in FIG. 3 being snapped into a pair of grooves or notches 25 and 26 in rotor 11. The rotor grooves preferably are formed so as to accommodate at least two rings per groove.

Figure 3:
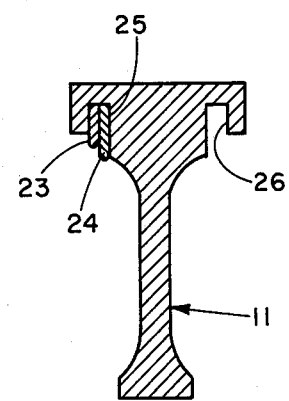
FIG. 3 is a cross section of the top half of the rotor of FIG. 1 taken along a line substantially corresponding to line 3—3 therein.

Balance correction is obtained according to the invention by installing a pair of rings in tandem in either or both of grooves 25 and 26. Each pair preferably is disposed at different rotary angles as shown in FIGS. 1 and 3, with the relative rotary displacement placing respective tabs in different grooves or angular orientation retention locations. This is shown in FIG. 3 by the comparatively smaller cross section of ring 23. The angular orientation of one ring to the other in a pair establishes the magnitude of the resulting balance correction which may be described by the vector sum of the unbalance vector of each ring. The angular orientation of the correction vector is determined by the orientation of each pair of rings relative to the rotor.

There is thus provided a balance correction system that is particularly suited for fan engines and compressors having axial dovetails or slots wherein axial grooves may be formed in the rotor and the rings snapped thereinto. The axial dovetails provide natural intervals for angular orientation retention, and the snap-in installation simply by elastic contraction avoids many of the difficulties of installation of prior turbomachinery balancing systems. The snap-ring of the present invention is split at the narrowest dimension of the ring to further facilitate installation.

The present balancing system avoids the use of balance weights or other heretofore special balance features, thus eliminating the complexity of extra components and difficult installation. The present system is also advantageous in that the normally clear access to the retaining ring grooves simplifies making balance corrections particularly where blade or other component removal would normally be required for making a correction.

What is claimed is:

1. A balancing system comprising in combination:
   a rotor rotatable about an axis;
   at least a pair of balancing rings mounted for rotation with said rotor, each of said balancing rings is provided with a radially extending tab; and
   a plurality of axial retention locations positioned on said rotor in the form of axial slots parallel the axis, said tabs of said balancing rings are oriented in selected axial retention locations for providing balance correction.

2. The system of claim 1 wherein each of said balancing rings have a nonuniform mass distribution and is radially split diametrically opposite said tab.

3. The system of claim 2 wherein each of said rings is resilient.

4. The system of claim 1 wherein the rotor has at least one annular groove intersecting the axial slots and the rings are mounted on the rotor in the annular groove.

5. A balance system, comprising:

a rotor having at least one annular groove intersecting at least one axial recess;

at least a pair of substantially identical split balancing rings adapted to be inserted into said groove for rotation with said rotor; and said split rings are each provided with an eccentricity of mass adapted to be received in a selected axial recess;

whereby said rings may be oriented with said eccentricities in a different recess to balance said rotor and their relative orientation may be readily changed.

6. The balance system as defined in claim 5 wherein said balancing rings are identically shaped flat plates of substantially circular peripheries having eccentrically located openings therethrough so as to form asymmetrical rings of varying width, said asymmetrical rings having a radial slot which traverses the narrowest dimension of said rings to accommodate compression prior to urging into said groove.

7. The balance system as defined in claim 2 wherein said eccentricity of mass is a substantially radial extension at substantially the widest dimension of each of said rings.

8. A balance system, comprising:

at least a pair of substantially identical resilient balancing rings of nonuniform cross section; and a rotor having at least one annular groove for holding said rings and at least one axial slot intersecting said annular groove;

said rings having like eccentricities of mass adapted to be inserted in said axial slot;

whereby said rings may be oriented relative to one another in the same groove to achieve balance of said rotor.

9. The balancing means as defined in claim 8 wherein said axial slot is a dovetail in the peripheries of said rotor and said eccentricities of mass include tab-like appendages extending from substantially the widest cross-sectional dimension of said rings.

10. The balancing means as defined in claim 9 wherein said balancing rings are identically shaped flat plates of substantially circular peripheries having eccentrically located openings therethrough so as to form asymmetrical rings of varying width.

11. The balancing means as defined in claim 10 wherein said asymmetrical rings have a radial slot which traverses the narrowest cross-sectional dimension of said rings.

12. The balancing means as defined in claim 11 wherein said appendages are positioned diametrically opposite said slots.

* * * * *